(12) United States Patent
Wood et al.

(10) Patent No.: US 6,535,318 B1
(45) Date of Patent: Mar. 18, 2003

(54) INTEGRATED OPTOELECTRONIC DEVICES HAVING POP-UP MIRRORS THEREIN AND METHODS OF FORMING AND OPERATING SAME

(75) Inventors: Robert L. Wood, Cary, NC (US); Edward A. Hill, Chapel Hill, NC (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/511,928

(22) Filed: Feb. 23, 2000

Related U.S. Application Data

(60) Provisional application No. 60/165,317, filed on Nov. 12, 1999.

(51) Int. Cl.[7] .............................. G02B 26/08; G02F 1/09
(52) U.S. Cl. ....................... 359/224; 359/291; 359/298; 359/280
(58) Field of Search ................................ 359/223–226, 359/290, 291, 298, 280, 292

(56) References Cited

U.S. PATENT DOCUMENTS

| | | | |
|---|---|---|---|
| 5,071,510 A | 12/1991 | Findler et al. ............... 156/647 |
| 5,148,604 A | 9/1992 | Bantien ........................ 33/366 |
| 5,242,533 A | 9/1993 | Trah et al. ................... 156/628 |
| 5,295,014 A | 3/1994 | Toda ........................... 359/202 |
| 5,579,148 A | 11/1996 | Nishikawa et al. .......... 359/214 |
| 5,579,149 A | 11/1996 | Moret et al. ................. 359/223 |
| 5,579,151 A | * 11/1996 | Cho ............................ 359/291 |
| 5,719,073 A | 2/1998 | Shaw et al. .................. 437/228 |
| 5,761,350 A | 6/1998 | Koh ............................. 385/14 |
| 5,781,331 A | * 7/1998 | Carr et al. ................... 359/288 |
| 5,793,519 A | * 8/1998 | Furlani et al. ............... 359/291 |
| 5,846,849 A | 12/1998 | Shaw et al. ................... 438/52 |
| 5,847,454 A | 12/1998 | Shaw et al. .................. 257/734 |
| 5,867,302 A | 2/1999 | Fleming ...................... 359/291 |
| 5,880,921 A | 3/1999 | Tham et al. ................. 361/233 |
| 5,903,380 A | 5/1999 | Motamedi et al. .......... 359/224 |
| 5,905,007 A | 5/1999 | Ho et al. ........................ 430/22 |
| 5,910,856 A | * 6/1999 | Ghosh et al. ................ 359/291 |
| 5,914,801 A | * 6/1999 | Dhuler et al. ................ 359/230 |
| 5,920,417 A | 7/1999 | Johnson ....................... 359/223 |
| 5,943,155 A | 8/1999 | Goossen ...................... 359/247 |
| 6,014,240 A | * 1/2000 | Floyd et al. ................. 359/201 |
| 6,201,629 B1 | * 3/2001 | McClelland et al. ........ 359/223 |
| 6,233,088 B1 | * 5/2001 | Roberson et al. ........... 359/291 |
| 6,275,320 B1 | * 8/2001 | Dhuler et al. ............... 359/237 |

OTHER PUBLICATIONS

Clerc et al., "Advanced Deep Reactive Ion Etching: A Versatile Tool for Microelectromechanical Systems," J. Micromech. Microeng. 8, 1998 pp. 272–278.

Marxer et al, "Vertical Mirrors Fabricated by Deep Reactive Ion Etching For Fiber–Optic Switching Applications," Journal of Microelectromechanical Systems, vol. 6, No. 3, Sep. 1997.

Marxer et al., "Vertical Mirrors Fabricated by Reactive Ion Etching For Fiber Optical Switching Applications," IEEE, 1997, pp. 49–54.

Toshiyoshi, "Micromachined Polysilicon Torsion Mirrors for an Electrostatic Optical Switch in a Free Space," SPIE, vol. 3321, 1998, pp. 556–561.

* cited by examiner

*Primary Examiner*—Evelyn A Lester
(74) *Attorney, Agent, or Firm*—Myers Bigle Sibley & Sajovec

(57) ABSTRACT

Integrated optoelectronic devices include a substrate having an opening therein that extends at least partially therethrough and a ledge extending inwardly from a sidewall of the opening. A pop-up mirror is provided in the opening. The mirror has an underside edge that is supported by an upward facing portion of the ledge when the mirror is in a closed position. A hinge is also provided. The hinge mechanically couples the mirror to the substrate so that the mirror can be rotated from the closed position to an open position.

29 Claims, 10 Drawing Sheets

INTEGRATED OPTOELECTRONIC DEVICES HAVING POP-UP MIRRORS THEREIN AND METHODS OF FORMING AND OPERATING SAME

REFERENCE TO PRIORITY APPLICATION

This application claims priority to U.S. Provisional Application Ser. No. 60/165,317, filed Nov. 12, 1999.

FIELD OF THE INVENTION

The present invention relates to optoelectronic devices and methods of forming and operating same and, more particularly, to optoelectronic devices that utilize reflective surfaces to direct optical energy and methods of forming and operating same.

BACKGROUND OF THE INVENTION

Micro-electromechanical (MEM) devices having mirrors therein have been proposed for directing optical beams across an optoelectronic substrate. Such devices are useful in a wide variety of applications ranging from displays to photonic NxN switches. Such devices are disclosed in U.S. Pat. No. 5,903,380 to Motamedi et al. entitled "Micro-Electromechanical (MEM) Optical Resonator and Method". In particular, the '380 patent to Motamedi et al. discloses an integrated micro-electromechanical optical resonator that comprises a cantilever beam which is fixed to a substrate at one end and extends freely over the substrate at the other end. A bimorph actuator is also provided and is stacked on top of the beam at its fixed end. A reflective surface also partially covers the top of the beam at its free end. The bimorph actuator comprises material layers having different thermal expansion coefficients. A DC-biased AC voltage connected across the actuator causes it to heat and cool as the current passing through it increases and decreases. This creates a thermal bimorph effect which causes the cantilever beam and the reflective surface to oscillate in accordance with the varying current. Combining the resonator with a light source and actuator excitation circuitry creates an optical scanner engine which delivers a scan angle in excess of 20 degrees and a high scan rate. Unfortunately, the mirror surface provided on the cantilever beam of the '380 patent may not have near diffraction-limited optical quality because the cantilever beam may become warped or otherwise distorted in response to the bimorph effect.

U.S. Pat. No. 5,867,302 to Fleming entitled "Bistable Micro-electromechanical Actuator" also discloses a MEM device having mirrors therein. In particular, the '302 patent discloses a MEM actuator that is formed on a substrate and includes a stressed membrane of generally rectangular shape that upon release assumes a curvilinear cross-sectional shape due to attachment at a midpoint to a resilient member and at opposing edges to a pair of elongate supports. The stressed membrane can be electrostatically switched between a pair of mechanical states having mirror-image symmetry, with the MEM actuator remaining in a quiescent state after a programming voltage is removed. The bistable MEM actuator according to various embodiments of the present invention can be used to form a nonvolatile memory element, an optical modulator (with a pair of mirrors supported above the membrane and moving in synchronism as the membrane is switched), a switchable mirror (with a single mirror supported above the membrane at the midpoint thereof) and a latching relay (with a pair of contacts that open and close as the membrane is switched). Arrays of bistable MEM actuators can also be formed for applications including nonvolatile memories, optical displays and optical computing. FIGS. 7a–7b of the '302 patent also disclose an embodiment of the MEM actuator that includes a rotatable mirror. Unfortunately, the process described in the '302 patent for forming a membrane upon which the rotatable mirror is supported is relatively complicated and may not be suitable with conventional microelectronic processing techniques. Thus, the devices disclosed in the '302 patent may not be readily integrated with electronic devices on conventional integrated circuit substrates.

Thus, notwithstanding the above-described MEM devices having mirrors therein, there continues to be a need for optoelectronic devices that can redirect optical beams and have near diffraction-limited optical quality and methods of forming and operating same that are compatible with conventional microelectronic device fabrication techniques.

SUMMARY OF THE INVENTION

It is therefore an object of the present invention to provide improved optoelectronic devices and methods of forming and operating same.

It is another object of the present invention to provide optoelectronic devices that can redirect optical beams and methods of forming and operating same.

It is still another object of the present invention to provide optoelectronic devices having movable reflective microstructures therein and methods of forming and operating same.

It is a further object of the present invention to provide optoelectronic devices having reflective microstructures therein with near diffraction-limited optical quality and methods of forming and operating same.

It is still a further object of the present invention to provide optoelectronic devices having optically reflective mirrors therein that can exhibit extreme flatness over apertures of up to several millimeters and methods of forming and operating same.

These and other objects, advantages and features of the present invention may be provided by optoelectronic devices that, according to one embodiment of the present invention, comprise a substrate having an opening therein that extends at least partially therethrough. A mirror having near diffraction-limited quality is also provided in the opening and is mechanically coupled to the substrate by a hinge so that the mirror can be rotated from a closed position to an open position. According to a preferred aspect of the invention, the mirror is formed from a monocrystalline silicon mirror backing layer having a thickness greater than about 10 μm and an optically reflective mirror surface on the backing layer. The mirror surface may comprise gold or aluminum, for example, and may be applied to the backing layer using an evaporation or sputtering technique. This monocrystalline silicon mirror backing layer is highly resistant to warping or other distortions caused when stresses are applied to it.

According to another preferred aspect of the present invention, the hinge comprises a polycrystalline silicon hinge that provides a mechanical and an electrical connection to the substrate. A layer of metal such as nickel is also provided on a back surface of the mirror backing layer so that an application of a sufficiently strong magnetic field to the opening will induce a force on the layer of metal that operates to pull the mirror backing layer to an upright position. An electrostatic polysilicon clamp electrode is also provided on the monocrystalline silicon mirror backing layer. This clamp electrode can be used advantageously to clamp the mirror in a closed position even if a sufficiently strong magnetic field is applied to the opening. Thus, a substrate having a plurality of individually controllable reflective microstructures (e.g., "pop-up" mirrors) can be provided in accordance with the present invention.

According to another embodiment of the present invention, preferred methods of forming optoelectronic devices include the steps of forming an electrically conductive layer on a first surface of a substrate and then forming a mirror backing layer from the electrically conductive layer by forming an endless groove that extends through the electrically conductive layer. The endless groove is preferably formed using a deep reactive ion etching (DRIE) technique, however, an anisotropic etching step may also be performing using an etchant such as KOH. A portion of the substrate at a second surface thereof is then removed to expose a front surface of the mirror backing layer. An optically reflective mirror surface can then be formed on the front surface of the mirror backing layer. The substrate may also comprise a supporting layer of monocrystalline silicon (e.g., silicon wafer) having a thickness of greater than about 100 μm and the step of removing a portion of the substrate may comprise the step of etching through the supporting layer of monocrystalline silicon using a deep reactive ion etching technique.

Methods according to the present invention also preferably include the step of forming a polysilicon hinge that is attached to a back surface of the mirror backing layer and is attached to the electrically conductive layer. The step of forming an optically reflective mirror surface also preferably comprises evaporating or sputtering a layer of gold or aluminum onto the front surface of the mirror backing layer. In order to enable magnetic actuation of the mirror backing layer, a layer of nickel is electroplated onto the back surface of the mirror backing layer. But, to inhibit magnetic actuation, the step of forming a polysilicon hinge also preferably comprises the step of forming a polysilicon electrostatic clamping electrode that is attached to the back surface of the mirror backing layer and overlaps the endless groove. The step of forming a polysilicon hinge and polysilicon clamping electrode is also preceded by the step of filling the endless groove with an electrically insulating layer by thermally oxidizing at least one sidewall of the mirror backing layer that is exposed by the endless groove. Any remaining opening in the groove may then be filled by depositing a phosphorus-doped silicate glass (PSG) layer into the groove and then planarizing the deposited layer to be flush with the back surface of the mirror backing layer.

DESCRIPTION OF PERFERRED EMBODIMENTS

Figure 1A:
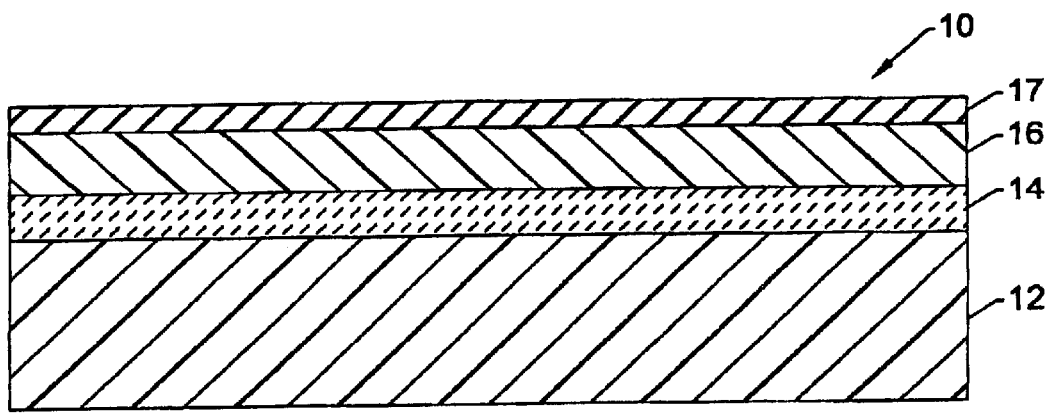
FIGS. 1A–1I are cross-sectional views of intermediate structures, taken along line 1—1' of FIG. 2, that illustrate preferred methods of forming optoelectronic devices having pop-up mirrors therein, according to a first embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present. Also, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to FIGS. 1A–1I, preferred methods of forming optoelectronic devices having pop-up mirrors therein include the step of forming a silicon-on-insulator (SOI) substrate 10. As illustrated by FIG. 1A, the SOI substrate 10 may comprise a monocrystalline silicon wafer 12 having a thickness of greater than about 100 μm and an intermediate electrically insulating layer 14 on an upper surface of the silicon wafer 12. The intermediate electrically insulating layer 14 may be formed by thermally oxidizing the upper surface of the silicon wafer 12. The intermediate electrically insulating layer 14 preferably has a thickness in a range between about 0.1 μm and 0.5 μm. The SOI substrate 10 also preferably comprises an electrically conductive layer 16 of monocrystalline silicon having a thickness in a range between about 10 μm and 100 μm, and more preferably about 50 μm. This electrically conductive layer 16 may have a polished surface and this polished surface may be bonded to the intermediate electrically insulating layer 14 using conventional wafer bonding techniques, for example. Alternatively, the electrically conductive layer 16 may be formed on an upper surface of the intermediate electrically insulating layer 14 using epitaxial lateral overgrowth (ELO) techniques. A silicon nitride layer 17 having a thickness in a range between about 0.1 and 0.5 μm may also be formed on the electrically conductive layer 16.

Figure 1B:
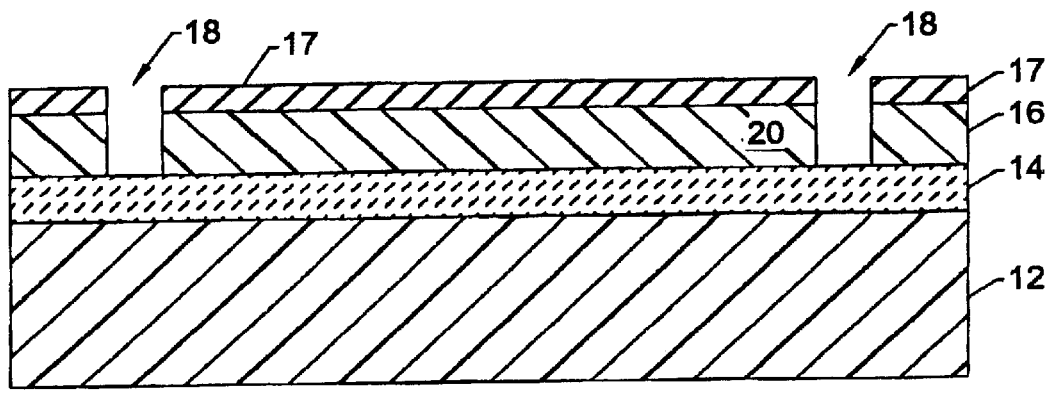
Figure 2:
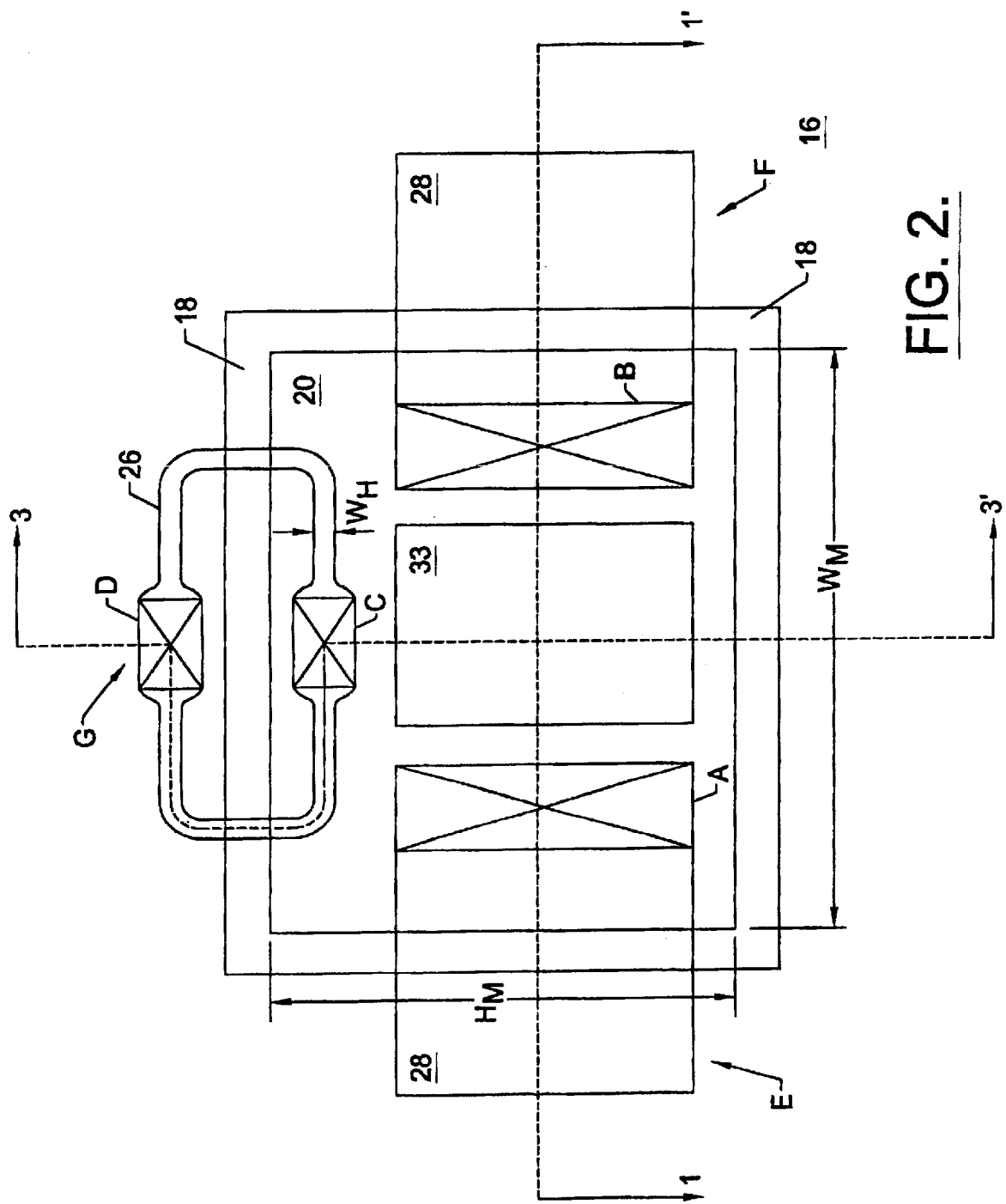
FIG. 2 is a plan layout schematic of an optoelectronic device having a pop-up mirror therein, according to the first embodiment of the present invention.

Referring now to FIGS. 1B and 2, a mirror backing layer 20 may be defined by forming an endless groove 18 that extends through the electrically conductive layer 16 and exposes the intermediate electrically insulating layer 14 which acts as an etch-stop layer. The mirror backing layer 20 may be defined as a rectangular-shaped layer having a width "$W_M$" of about 350 μm and a height "$H_M$" of about 250 μm when viewed in an open position. The endless groove 18 is preferably formed by selectively etching the electrically conductive layer 16 using a deep reactive ion etching (DRIE) technique that provides a high degree of selectivity and facilitates the formation of a groove 18 having a high aspect ratio. This DRIE technique can be performed using a DRIE tool, such as a Multiplex tool manufactured by Surface Technology Systems, Ltd. (see, http://www.stsystems.com/equip.html). Using this tool, a groove 18 having a width of 5 µm and a depth corresponding to the thickness of the electrically conductive layer 16 (e.g., 50 µm) can be formed. Alternatively, the endless groove 18 may at least be partially formed by an anisotropic etching step using a KOH etchant.

Figure 1C:
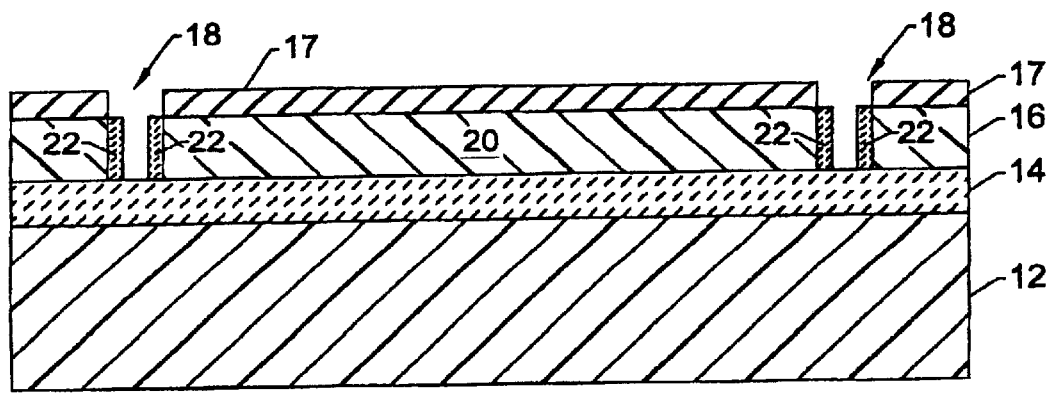

As illustrated by FIG. 1C, a step is then performed to narrow the effective width of the groove 18. This step is preferably achieved by performing a thermal oxidation step to selectively grow oxide spacers 22 on the exposed sidewalls of the electrically conductive layer 16 and the mirror backing layer 20 (using the silicon nitride layer 17 as a thermal oxidation mask). For a groove 18 having a width of about 5 µm, the oxide spacers 22 may be formed to have a thickness of about 2 µm. As will be understood by those skilled in the art, the formation of the oxide spacers 22 will cause the sidewalls of the electrically conductive layer 16 and the mirror backing layer 20 to become recessed since silicon atoms within these layers will be consumed during the thermal oxidation step. Thus, notwithstanding the fact that the oxide spacers may be formed to have a thickness of about 2 µm for a groove 18 having a width of 5 µm, the resulting width of the groove 18 after the thermal oxidation step will be greater than about 1 µm.

Figure 1D:
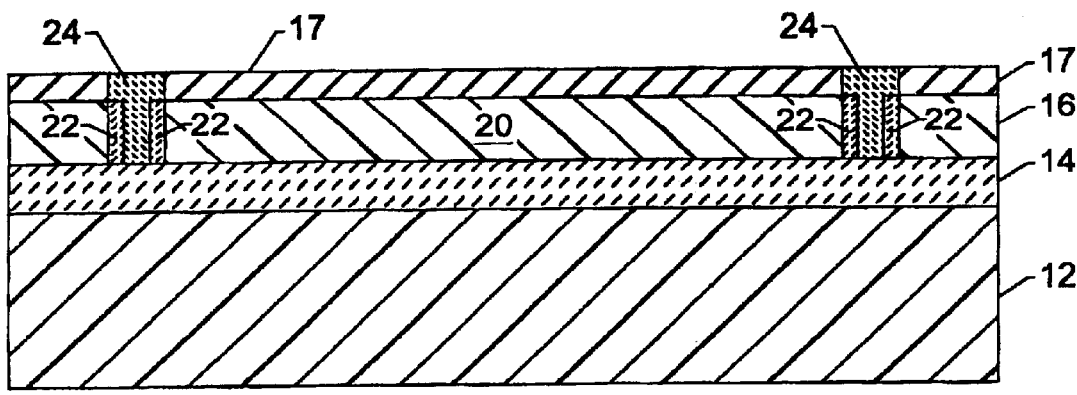

Referring now to FIG. 1D, a step is then performed to fill the remaining opening in the groove 18 with an electrically insulating material by depositing a blanket layer of phosphorus-doped silicate glass (PSG) on the structure of FIG. 1C. This blanket layer is then planarized to define a sacrificial insulating region 24 within the groove 18. In the event the oxide spacers 22 are not formed and a relatively thick PSG blanket layer is deposited into the groove 18, the planarization step may comprise a chemical-mechanical polishing (CMP) step.

Figure 1E:
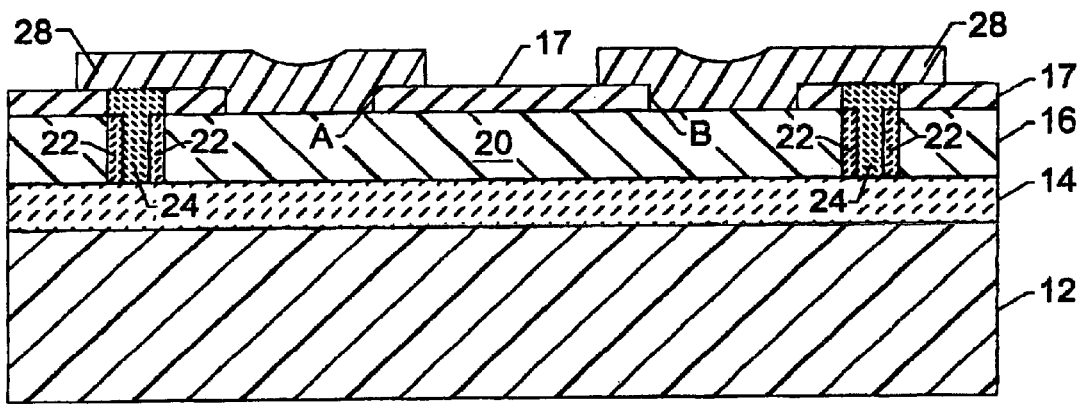
Figure 1F:
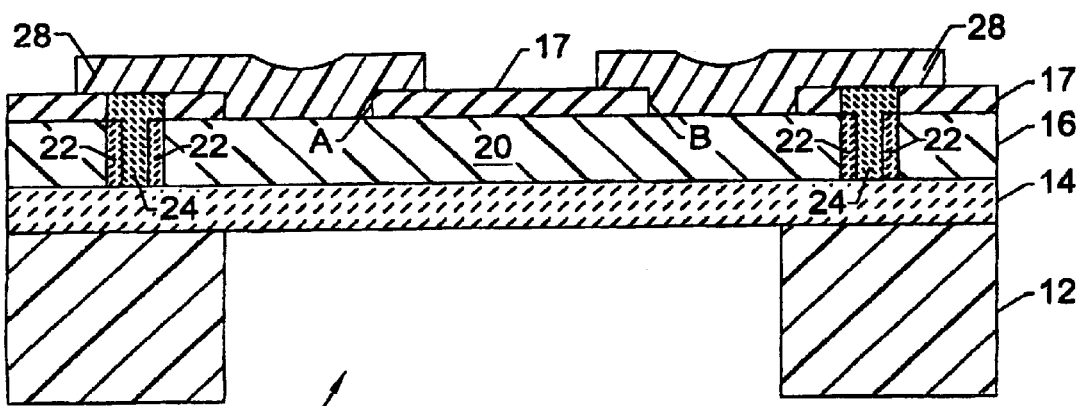

Referring now to FIGS. 1E and 2, a photolithographically defined etching step may then be performed to remove portions of the blanket silicon nitride layer 17 and thereby expose selected portions of a back surface of the mirror backing layer 20 (contact openings A, B and C) and expose a portion (contact opening D) of the electrically conductive layer 16 that extends adjacent the groove 18. Next, a blanket layer of polycrystalline silicon having a thickness in a range between about 1 µm and 3 µm (e.g., 2 µm) is deposited onto the silicon nitride layer 17 and onto the exposed portions of the surface of the electrically conductive layer 16 and back surface of the mirror backing layer 20. The blanket layer of polycrystalline silicon is then patterned to define a polysilicon hinge 26 and a pair of polysilicon electrostatic clamp electrodes 28. According to a preferred aspect of the present invention, the oxide spacers 22 and sacrificial insulating region 24 within the groove 18 provide support to the blanket layer of polycrystalline silicon during the deposition and patterning steps. The polysilicon hinge 26 may be patterned to have a width "$W_H$" of about 8–10 µm. As illustrated best by FIGS. 2–3, the polysilicon hinge 26 electrically and mechanically couples the mirror backing layer 20 to the electrically conductive layer 16.

Referring now to FIG. 1 F, a backside of the monocrystalline silicon wafer 12 is then etched using another deep reactive ion etching (DRIE) technique, to define an opening 19 in the monocrystalline silicon wafer 12 that exposes the intermediate electrically insulating layer 14. During this DRIE step, the intermediate electrically insulating layer 14 acts as an etch-stop layer. In order to provide mechanical support for the mirror backing layer 20, the size of the opening is preferably designed to be smaller than the size of the mirror backing layer 20 as defined by the groove 18. However, because the electrostatic clamping electrodes 28 may also provide a sufficient mechanical support to suspend the mirror backing layer 20 within the opening 19, the size of the opening may be designed to be equal to or larger than the mirror backing layer 20.

Figure 1G:
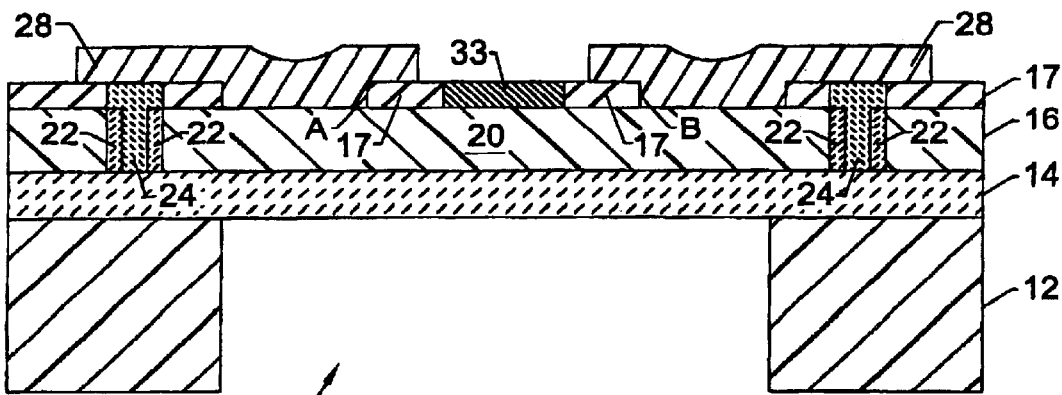

Then, as illustrated by FIGS. 1G and 2, another photolithographically defined etching step is performed on the silicon nitride layer 17, to expose the back surface of the mirror backing layer 20. This etching step is then followed by the step of electroplating a layer of nickel 33 having a thickness in a range between about 5 µm and 30 µm onto the exposed back surface of the mirror backing layer 20. Here, the etching mask that is used during etching of the silicon nitride layer 17 is also used as a mask during the electroplating step.

Figure 1H:
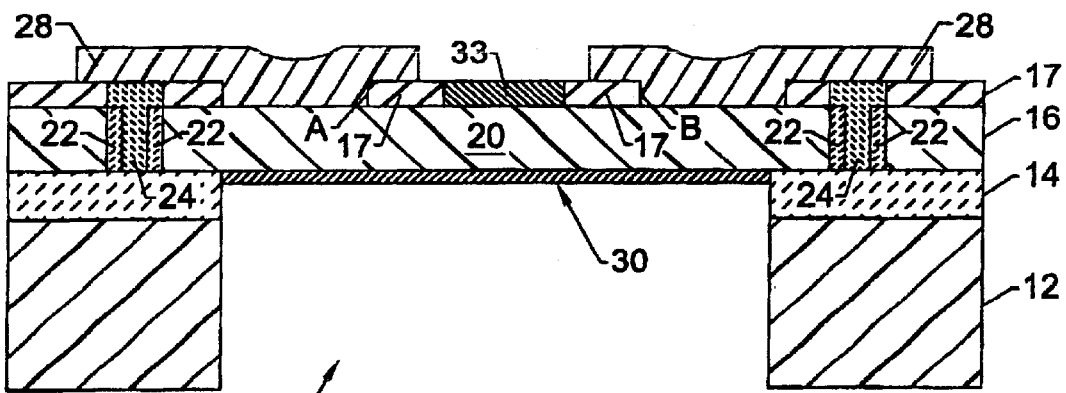
Figure 1I:
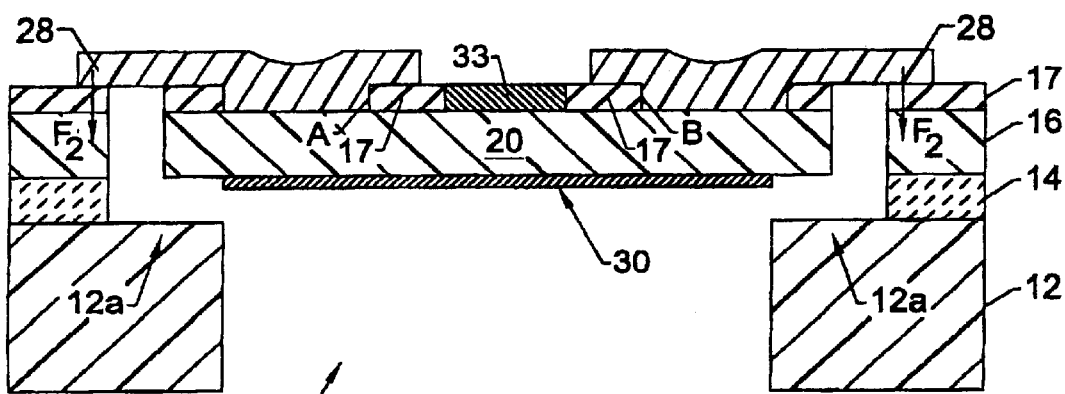

Referring now to FIG. 1H, a conventional etching step is then performed to remove the exposed portion of the intermediate electrically insulating layer 14 from the front polished surface of the mirror backing layer 20. An optically reflective mirror surface 30 is then formed on the front surface of the mirror backing layer 10. This mirror surface 30 may be formed by evaporating a layer of gold onto the front surface of the mirror backing layer 20. Alternatively, the mirror surface 30 may be formed by evaporating a layer of aluminum onto the front surface of the mirror backing layer 20. The mirror surface 30 may also be formed by sputtering a layer of gold or aluminum onto the front surface of the mirror backing layer 20. As will be understood by those skilled in the art, these techniques of evaporating or sputtering gold or aluminum to define the mirror surface 30 result in the formation of a mirror surface 30 that is self-aligned to the opening in the silicon wafer 12. The mirror backing layer 20 is then released by performing a selective etching step using the mirror surface 30 and silicon wafer 12 as an etching mask. In particular, a wet etching step may be performed that causes the intermediate electrically insulating layer 14 to become recessed and removes the oxide spacers 22 and the sacrificial insulating region 24 from within the groove 18, as illustrated by FIG. 1I. Upon completion of this wet etching step, the mirror backing layer 20 will be supported by the polysilicon electrostatic clamp electrodes 28 and the ledge 12a formed by the silicon wafer 12.

Figure 3:
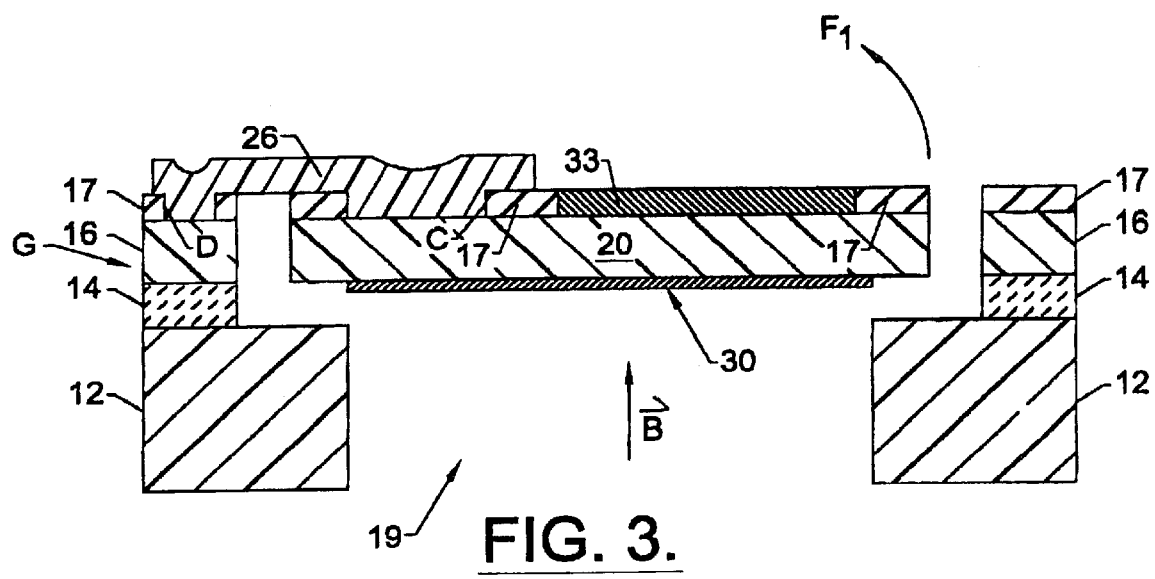
FIG. 3 is a cross-sectional view of the optoelectronic device of FIG. 2, taken along line 3—3'.

Referring now specifically to FIG. 2, a plan layout schematic of an optoelectronic device having a pop-up mirror therein is provided. As illustrated, the mirror backing layer 20 is mechanically and electrically coupled to the electrically conductive layer 16 by a polysilicon hinge 26 that enables the mirror backing layer 20 to be rotated from the closed position within the opening to an upright and open position. When in the open position, the mirror backing layer 20 may be disposed orthogonally relative to the electrically conductive layer 16. A pair of polysilicon electrostatic clamp electrodes 28 are also provided. These clamp electrodes 28 are attached to the mirror backing layer 20 at contact openings A and B, and are electrically connected to a first portion of the electrically conductive layer 16 (at contact opening D) by the polysilicon hinge 26. As illustrated by FIGS. 1I and 3, the clamp electrodes 28 extend opposite regions E and F within the electrically conductive layer 16. Respective portions of the silicon nitride layer 17 also extend between the electrically conductive layer 16 and the ends of each clamp electrode 28. These portions of the silicon nitride layer 17 act as a capacitor dielectric material when an electrostatic potential is established between the underlying portion of the electrically conductive layer 16 and the respective clamp electrode 28. This electrostatic potential induces a downward force $F_2$ on the clamp electrodes 28. A nickel frame layer 33 is also provided on the mirror backing layer 20. As determined by the inventors herein, the application of a magnetic field "B" of sufficient strength through the opening 19 will induce an upward force $F_1$ on the nickel frame layer 33 that pulls and rotates the mirror backing layer 20 to a substantially upright position. This upward force induced by the magnetic field "B" can be countered by the opposite electrostatic force $F_2$ established between the clamp electrodes 28 and respective opposing regions E and F of the electrically conductive layer 16 (regions E and F are electrically isolated from region G within the electrically conductive layer 16). Thus, even in the presence of a sufficiently strong magnetic field B, the mirror backing layer 20 may be clamped in a closed position.

Figure 4A:
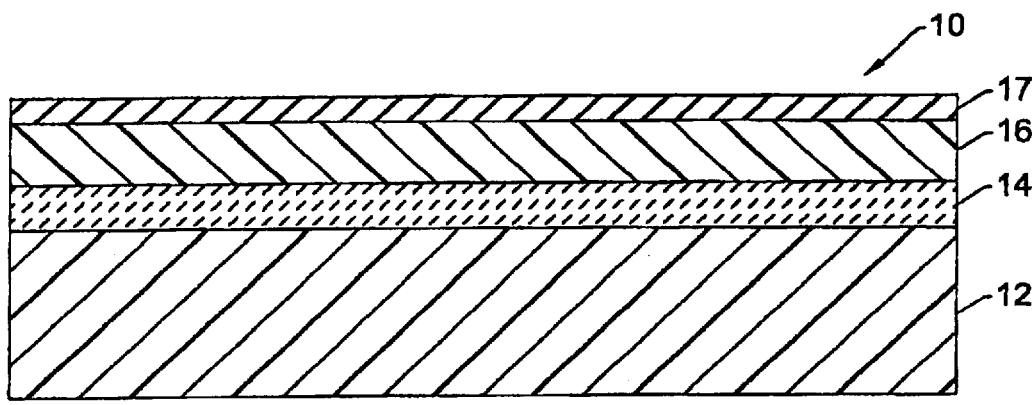
FIGS. 4A–4I are cross-sectional views of intermediate structures, taken along line 4—4' of FIG. 5, that illustrate preferred methods of forming optoelectronic devices having pop-up mirrors therein, according to a second embodiment of the present invention.

Referring now to FIGS. 4A–4I, preferred methods of forming pop-up mirrors according to another embodiment of the present invention include the step of forming a substrate 10. As illustrated by FIG. 4A, the substrate 10 may comprise a monocrystalline silicon wafer 12 having a thickness of greater than about 100 μm and an intermediate electrically insulating layer 14 on an upper surface of the silicon wafer 12. The intermediate electrically insulating layer 14 may be formed by thermally oxidizing the upper surface of the silicon wafer 12. The intermediate electrically insulating layer 14 preferably has a thickness in a range between about 0.1 μm and 0.5 μm. The substrate 10 also preferably comprises an electrically conductive layer 16 of monocrystalline silicon having a thickness in a range between about 10 μm and 100 μm, and more preferably about 50 μm. This electrically conductive layer 16 may have a polished surface and this polished surface may be bonded to the intermediate electrically insulating layer 14 using conventional wafer bonding techniques, for example. Alternatively, the electrically conductive layer 16 may be formed on an upper surface of the intermediate electrically insulating layer 14 using epitaxial lateral overgrowth (ELO) techniques. A silicon nitride layer 17 having a thickness in a range between about 0.1 and 0.5 μm may also be formed on the electrically conductive layer 16.

Figure 4B:
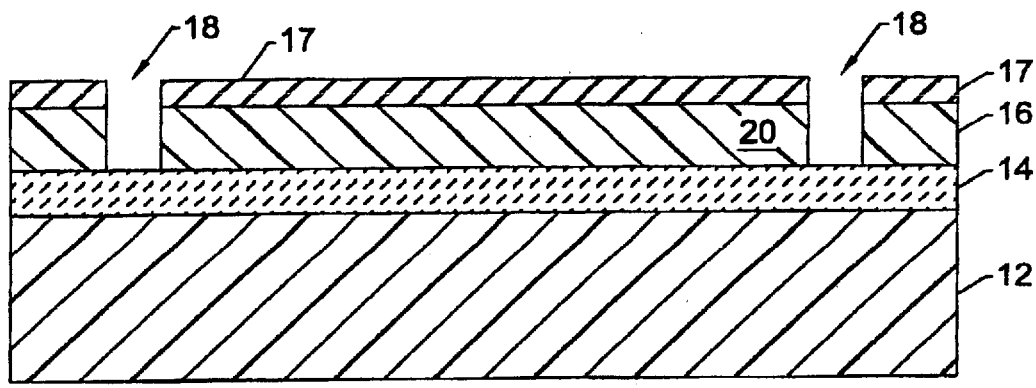
Figure 5:
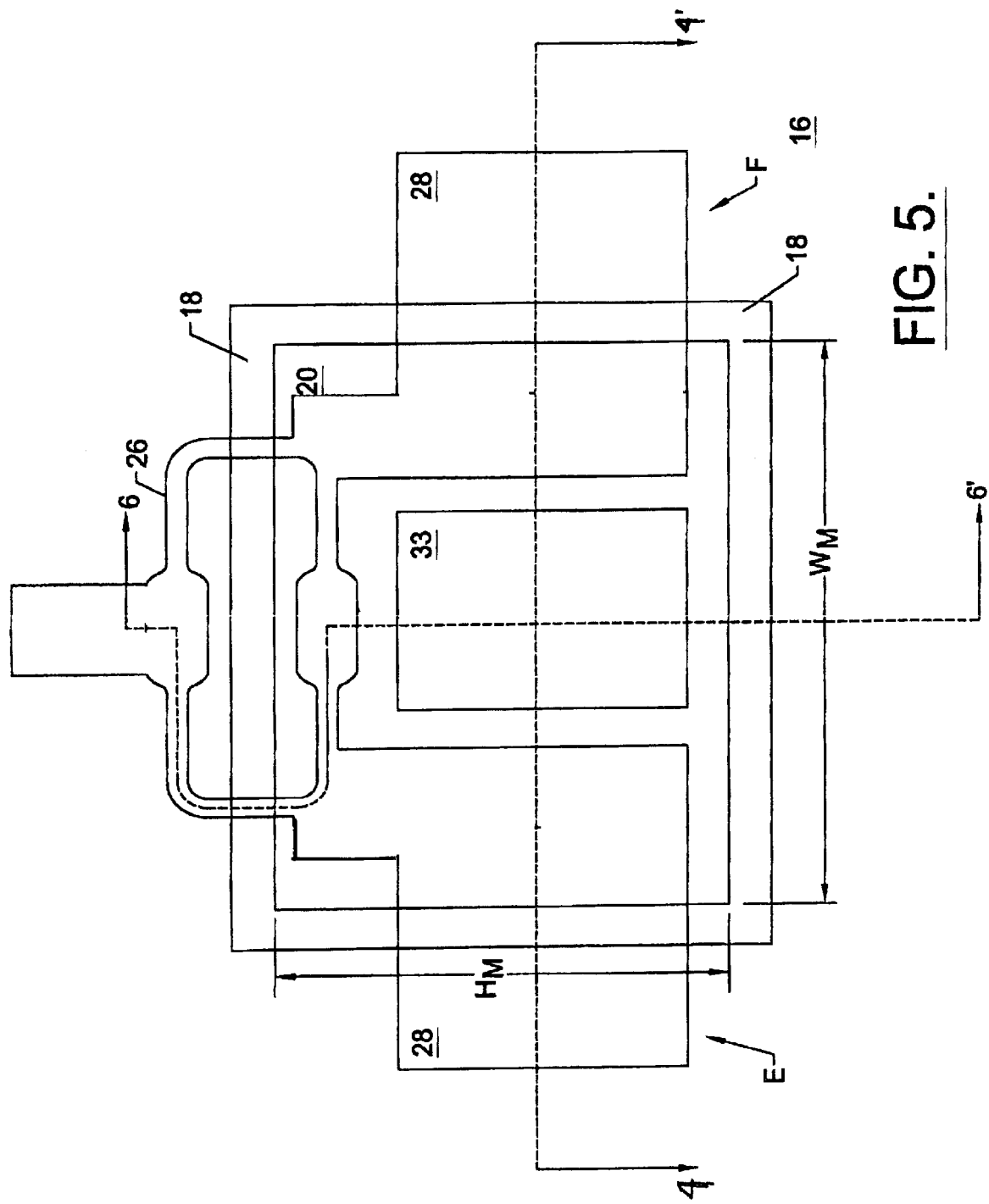
FIG. 5 is a plan layout schematic of an optoelectronic device having a pop-up mirror therein, according to the second embodiment of the present invention.

Referring now to FIGS. 4B and 5, a mirror backing layer 20 may be defined by forming an endless groove 18 that extends through the electrically conductive layer 16 and exposes the intermediate electrically insulating layer 14 which acts as an etch-stop layer. The mirror backing layer 20 may be defined as a rectangular-shaped layer having a width "$W_M$" of about 350 μm and a height "$H_M$" of about 250 μm when viewed in an open position. The endless groove 18 may be formed by selectively etching the electrically conductive layer 16 using a deep reactive ion etching (DRIE) technique that provides a high degree of selectivity and facilitates the formation of a groove 18 having a high aspect ratio. Alternatively, the endless groove 18 may be formed by an anisotropic etching step using a KOH etchant.

Figure 4C:
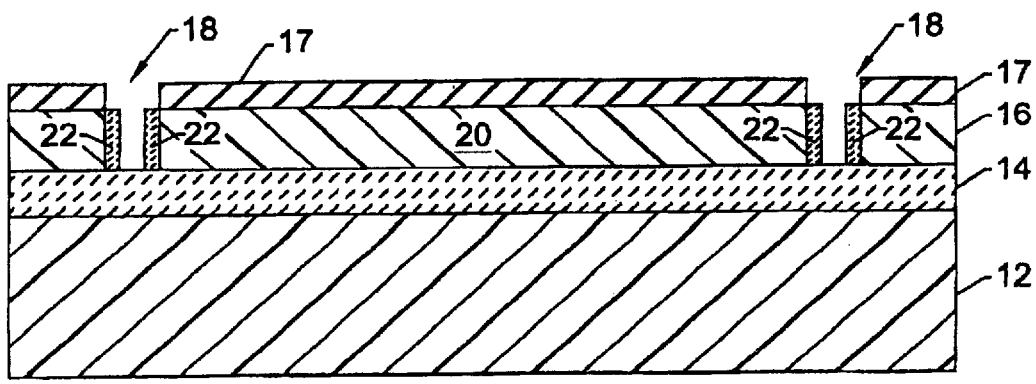

As illustrated by FIG. 4C, a step is then performed to narrow the effective width of the groove 18. This step is preferably achieved by performing a thermal oxidation step to selectively grow oxide spacers 22 on the exposed sidewalls of the electrically conductive layer 16 and the mirror backing layer 20 (using the silicon nitride layer 17 as a thermal oxidation mask). For a groove 18 having a width of about 5 μm, the oxide spacers 22 may be formed to have a thickness of about 2 μm.

Figure 4D:
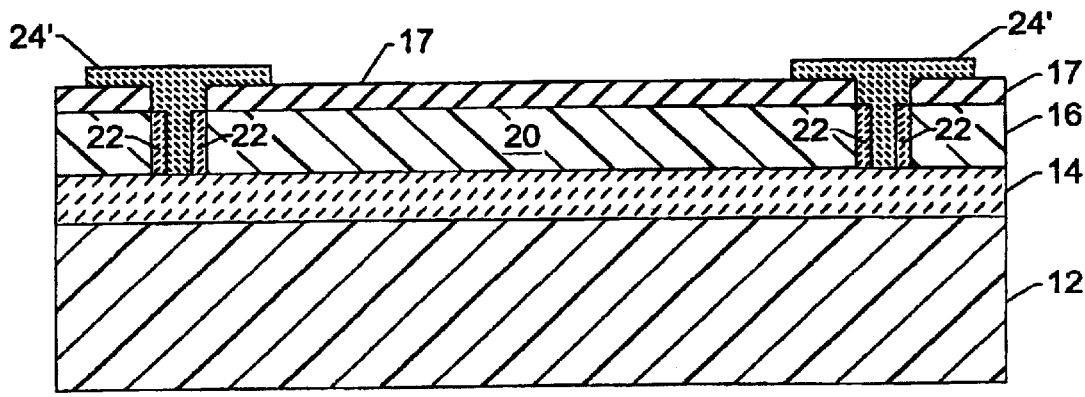
Figure 4E:
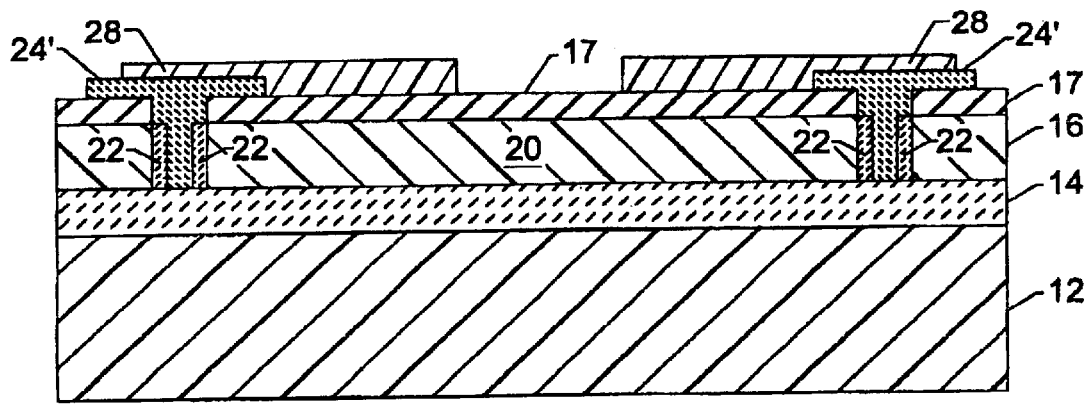

Referring now to FIG. 4D, a step is then performed to fill the remaining opening in the groove 18 with an electrically insulating material by depositing a blanket layer of phosphorus-doped silicate glass (PSG) on the structure of FIG. 4C. This blanket layer is then patterned to define a sacrificial insulating region 24' within the groove 18 and on the surface of the silicon nitride layer 17, as illustrated. Referring now to FIGS. 4E and 5, a blanket layer of polycrystalline silicon having a thickness in a range between about 1 μm and 3 μm (e.g., 2 μm) is then deposited onto the silicon nitride layer 17 and onto the patterned sacrificial insulating region 24'. The blanket layer of polycrystalline silicon is then patterned to define a polysilicon hinge 26 and a pair of polysilicon electrostatic clamp electrodes 28 that are electrically coupled to and contiguous with the hinge 26.

Figure 4F:
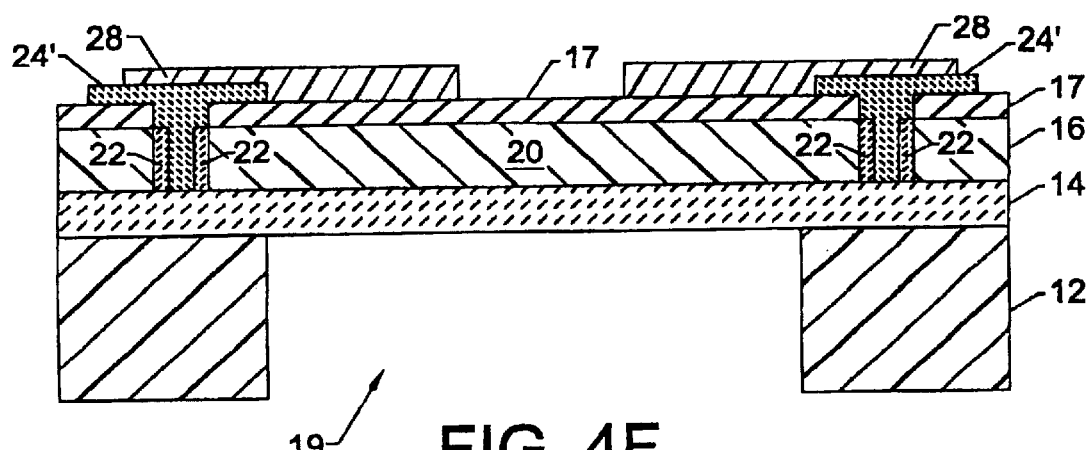
Figure 4G:
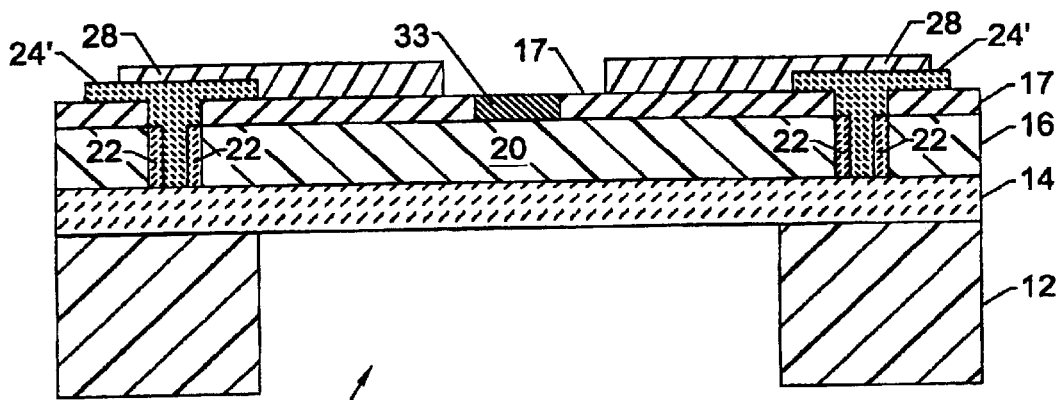

Referring now to FIG. 4F, a backside of the monocrystalline silicon wafer 12 is then etched using a deep reactive ion etching (DRIE) technique, to define an opening 19 in the monocrystalline silicon wafer 12 that exposes the intermediate electrically insulating layer 14. During this DRIE step, the intermediate electrically insulating layer 14 acts as an etch-stop layer. Then, as illustrated by FIGS. 4G and 5, a photolithographically defined etching step is performed on the silicon nitride layer 17 to expose the back surface of the mirror backing layer 20. This etching step is then followed by the step of electroplating a layer of nickel 33 having a thickness in a range between about 5 μm and 30 μm onto the exposed back surface of the mirror backing layer 20. Here, the etching mask that is used during etching of the silicon nitride layer 17 is also used as a mask during the electroplating step.

Figure 4H:
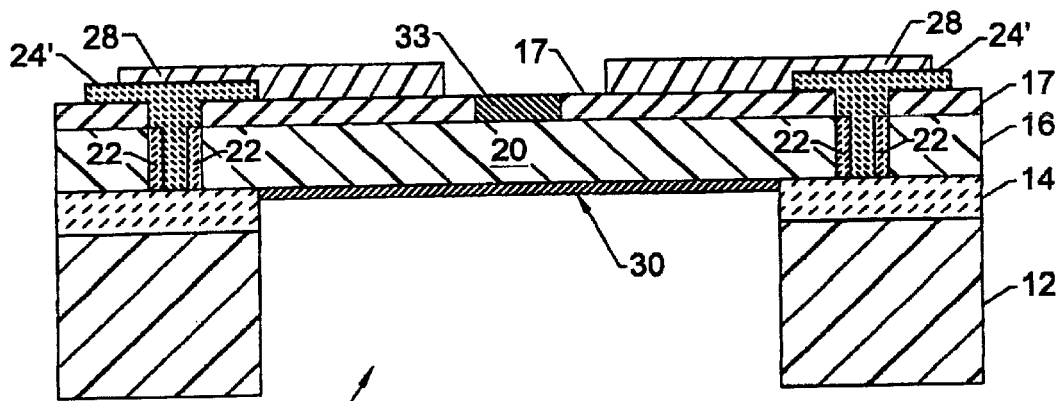

Referring now to FIG. 4H, a conventional etching step is then performed to remove the exposed portion of the intermediate electrically insulating layer 14 from the front polished surface of the mirror backing layer 20. An optically reflective mirror surface 30 is then formed on the front surface of the mirror backing layer 10. This mirror surface 30 may be formed by evaporating a layer of gold onto the front surface of the mirror backing layer 20.

Figure 4I:
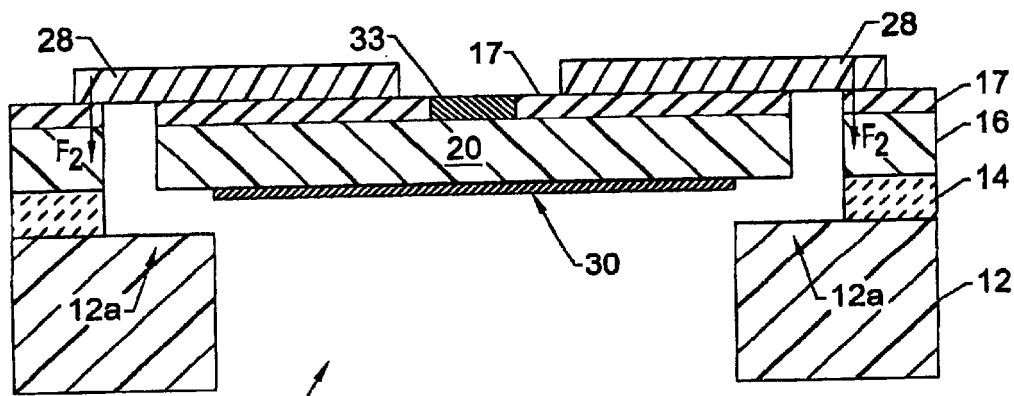

The mirror backing layer 20 is then released by performing a selective etching step using the mirror surface 30 and silicon wafer 12 as an etching mask. In particular, a wet etching step may be performed that causes the intermediate electrically insulating layer 14 to become recessed and removes the oxide spacers 22 and the sacrificial insulating region 24' from within the groove 18 and underneath the electrostatic clamp electrodes 28, as illustrated by FIG. 4I.

Figure 6:
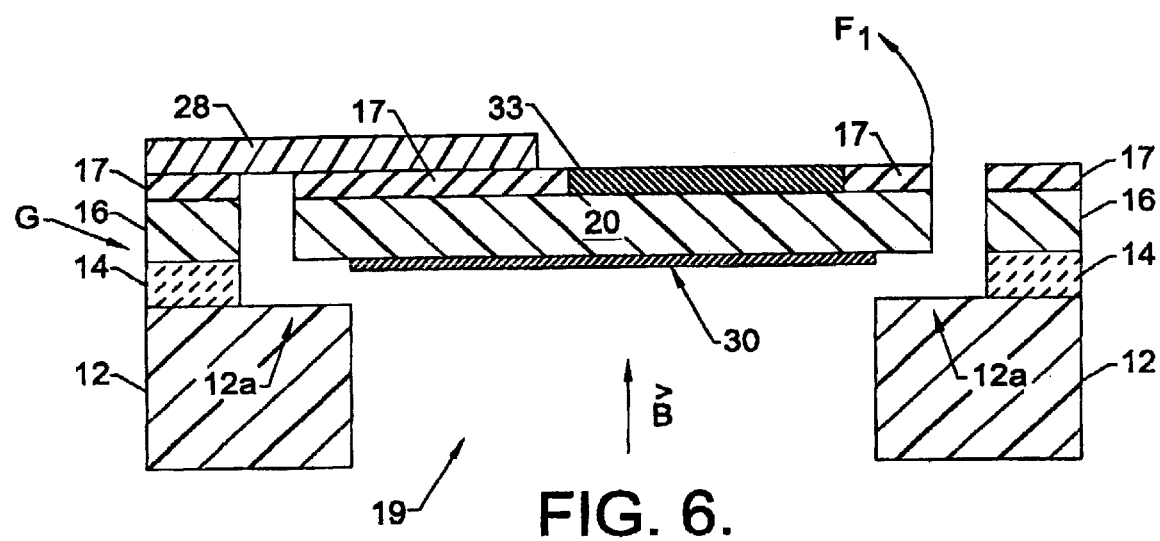
FIG. 6 is a cross-sectional view of the optoelectronic device of FIG. 5, taken along line 6—6'.

Referring now specifically to FIG. 5, a plan layout schematic of an optoelectronic device having a pop-up mirror therein is provided. As illustrated, the mirror backing layer 20 is mechanically coupled to the electrically conductive layer 16 by a polysilicon hinge 26 that enables the mirror backing layer 20 to be rotated from the closed position within the opening to an upright and open position. When in the open position, the mirror backing layer 20 may be disposed orthogonally relative to the electrically conductive layer 16. A pair of polysilicon electrostatic clamp electrodes 28 are also provided. As illustrated best by FIGS. 4I and 6, the clamp electrodes 28 extend opposite regions E and F within the electrically conductive layer 16. Respective portions of the silicon nitride layer 17 also extend between the electrically conductive layer 16 and the ends of each clamp electrode 28. These portions of the silicon nitride layer 17 act as a capacitor dielectric material when an electrostatic potential is established between the underlying portion of the electrically conductive layer 16 and the respective clamp electrode 28. This electrostatic potential induces a downward force $F_2$ on the clamp electrodes 28. A nickel frame layer 33 is also provided on the mirror backing layer 20. As determined by the inventors herein, the application of a magnetic field "B" of sufficient strength through the opening 19 will induce an upward force $F_1$ on the nickel frame layer 33 that pulls and rotates the mirror backing layer 20 to a substantially upright position. This upward force induced by the magnetic field "B" can be countered by the opposite electrostatic force $F_2$ established between the clamp electrodes 28 and respective opposing regions E and F of the electrically conductive layer 16 (regions E and F are electrically isolated from region G within the electrically conductive layer 16). Thus, even in the presence of a sufficiently strong magnetic field B, the mirror backing layer 20 may be clamped in a closed position.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An optoelectronic device, comprising:
    a substrate having an opening therein that extends at least partially therethrough and a ledge extending inwardly from a sidewall of the opening;
    a pop-up mirror in the opening, said mirror having an underside edge that is supported by an upward facing portion of the ledge when said mirror is in a closed position; and
    a hinge that mechanically couples said mirror to said substrate so that said mirror can be rotated from the closed position to an open position.

2. The device of claim 1, wherein said mirror has an optically reflective mirror surface thereon that is self-aligned to the opening.

3. The device of claim 2, wherein said optically reflective mirror surface comprises a material selected from the group consisting of gold and aluminum.

4. The device of claim 1, wherein said substrate has an electrically conductive layer therein that is substantially coplanar with said mirror when said mirror is in the closed position.

5. An optoelectronic device, comprising:
    a substrate having an opening therein that extends at least partially therethrough;
    a pop-up mirror that extends in the opening and comprises a monocrystalline silicon mirror backing layer having a thickness greater than about 10 μm; and
    a hinge that mechanically couples said mirror to said substrate so that said mirror can be rotated from a closed position to an open position.

6. The device of claim 5, wherein said mirror has an optically reflective mirror surface thereon that is self-aligned to the opening.

7. The device of Claim 6, wherein said mirror is rectangular in shape and has a length greater than about 200 μm.

8. An optoelectronic device, comprising:
    a substrate having an opening therein that extends at least partially therethrough and a ledge extending inwardly from a sidewall of the opening;
    a mirror in the opening, said mirror having an edge that is supported by the ledge when said mirror is in a closed position; and
    a polycrystalline silicon hinge that mechanically couples said mirror to said substrate so that said mirror can be rotated from the closed position to an open position.

9. An optoelectronic device, comprising:
    a substrate having an opening therein that extends at least partially therethrough;
    a mirror that extends in the opening and comprises a monocrystalline silicon mirror backing layer having a thickness greater than about 10 μm, said mirror having an optically reflective mirror surface thereon that is self-aligned to the opening; and
    a hinge that mechanically couples said mirror to said substrate so that said mirror can be rotated from a closed position to an open position, said hinge comprising a ring-shaped polycrystalline silicon layer that is attached to a back surface of said monocrystalline silicon mirror backing layer and is attached to a surface of said substrate at a location adjacent the opening.

10. An optoelectronic device, comprising:
    a substrate having an opening therein that extends at least partially therethrough and a ledge extending inwardly from a sidewall of the opening;
    a mirror in the opening, said mirror having an edge that is supported by the ledge when said mirror is in a closed position; and
    a hinge that mechanically couples said mirror to said substrate so that said mirror can be rotated from the closed position to an open position, said hinge comprising a ring-shaped polycrystalline silicon layer that is attached to a back surface of said mirror and is attached to a surface of said substrate at a location adjacent the opening.

11. An optoelectronic device, comprising:
    a substrate having an opening therein that extends at least partially therethrough;
    a mirror in the opening; and
    a hinge that mechanically couples said mirror to said substrate so that said mirror can be rotated from a closed position to an open position;
    wherein said substrate has an electrically conductive layer therein that is substantially coplanar with said mirror when said mirror is in the closed position;
    wherein said mirror comprises a monocrystalline silicon mirror backing layer having a thickness of greater than about 10 μm; and
    wherein said hinge comprises a polycrystalline silicon layer that is attached to a back surface of said monocrystalline silicon mirror backing layer and is attached to a surface of said electrically conductive layer at a location adjacent the opening.

12. The device of claim 11, further comprising an electrostatic polysilicon clamp electrode that is attached to the back surface of said monocrystalline silicon mirror backing layer.

13. The device of claim 12, wherein said electrostatic polysilicon clamp electrode extends opposite the surface of said electrically conductive layer.

14. The device of claim 13, wherein said substrate comprises a silicon-on-insulator (SOI) substrate.

15. An optoelectronic device, comprising:
    a substrate having an opening therein that extends at least partially therethrough;
    a mirror that extends in the opening and comprises a monocrystalline silicon mirror backing layer having a thickness greater than about 10 μm; and
    a hinge that mechanically couples said mirror to said substrate so that said mirror can be rotated from a closed position to an open position; and a metallic frame attached to a back surface of said monocrystalline silicon mirror backing layer, said metallic frame having an area that is sufficient to cause said mirror to rotate from the closed position to the open position when a magnetic field is established through the opening.

16. The device of claim 15, wherein said metallic frame comprises nickel.

17. An optoelectronic device, comprising:

a substrate having an opening therein that extends at least partially therethrough and a ledge extending inwardly from a sidewall of the opening, said substrate comprising:

a monocrystalline silicon supporting layer having a thickness of greater than about 100 $\mu$m;

an intermediate oxide layer on a surface of said monocrystalline silicon supporting layer; and a monocrystalline silicon conductive layer having a thickness of greater than about 10 $\mu$m on the intermediate oxide layer;

a mirror in the opening, said mirror having an edge that is supported by the ledge when said mirror is in a closed position; and a hinge that mechanically couples said mirror to said substrate so that said mirror can be rotated from the closed position to an open position.

18. The device of claim 17, wherein the opening extends through the monocrystalline silicon supporting layer, the intermediate oxide layer and the monocrystalline silicon conductive layer; wherein a size of the opening in the monocrystalline silicon supporting layer is less than a size of the opening in the monocrystalline silicon conductive layer; and wherein the edge of said mirror rests on the surface of said monocrystalline silicon supporting layer when said mirror is in a closed position.

19. An optoelectronic device, comprising:

a substrate having an opening therein that extends at least partially therethrough;

a pop-up mirror that extends in the opening and comprises a monocrystalline silicon mirror backing layer having a thickness greater than about 10 $\mu$m; and a polycrystalline silicon hinge that mechanically couples said mirror to said substrate so that said mirror can be rotated from a closed position to an open position.

20. The device of claim 19, wherein said mirror has an optically reflective mirror surface thereon that is self-aligned to the opening.

21. An optoelectronic device, comprising:

a silicon-on-insulator substrate having an opening therein;

a mirror that is disposed in the opening when in a closed position; and a polysilicon hinge that mechanically couples said mirror to said silicon-on-insulator substrate so that said mirror can be rotated from the closed position to an open position when a magnetic field is directed to pass through the opening.

22. The device of claim 21, wherein said mirror comprises:

a monocrystalline silicon backing layer having a thickness of greater than about 10 $\mu$m; and an optically reflective mirror surface on a front surface of said monocrystalline silicon backing layer.

23. The device of claim 22, further comprising an electrostatic polysilicon clamp electrode that is attached to the back surface of said monocrystalline silicon backing layer.

24. The device of claim 23, wherein said electrostatic polysilicon clamp electrode extends opposite said silicon-on-insulator substrate and provides mechanical support to said mirror when in the closed position.

25. The device of claim 22, wherein said optically reflective mirror surface is self-aligned to the opening.

26. The device of claim 25, wherein said optically reflective mirror surface comprises a material selected from the group consisting of aluminum and gold.

27. A method of operating an optoelectronic device comprising a semiconductor substrate having an opening therein, a pop-up mirror that is disposed in the opening when in a closed position and has an optically reflective mirror surface thereon that is self-aligned to the opening and a hinge that mechanically couples the mirror to the semiconductor substrate, said method comprising the step of:

applying a magnetic field of sufficient strength through the opening to cause the pop-up mirror to rotate about the hinge from the closed position to an upright open position.

28. A method of operating an optoelectronic device comprising a semiconductor substrate having an opening therein, a mirror disposed in the opening when in a closed position, an electrostatic clamping electrode that is attached to the mirror and extends opposite a first portion of a surface of the semiconductor substrate when the mirror is in the closed position and a polysilicon hinge that mechanically couples the mirror to the semiconductor substrate and electrically couples the mirror to a second portion of the surface of the semiconductor substrate, said method comprising the steps of:

applying a magnetic field of sufficient strength through the opening to cause the mirror to rotate about the hinge from the closed position to an open position; and clamping the mirror in the closed position by establishing an electrostatic potential between the electrostatic clamping electrode and the surface of the semiconductor substrate, while simultaneously applying a magnetic field through the opening.

29. An optoelectronic device, comprising:

a substrate having an opening therein that extends at least partially therethrough;

a pop-up mirror in the opening, said pop-up mirror having an optically reflective mirror surface thereon that is self-aligned to the opening; and a hinge that mechanically couples said pop-up mirror to said substrate so that said mirror can be rotated from the closed position to an upright open position.

* * * * *